W. A. SALT.
DENTAL PLUGGER.
APPLICATION FILED FEB. 14, 1911.
1,040,424.
Patented Oct. 8, 1912.
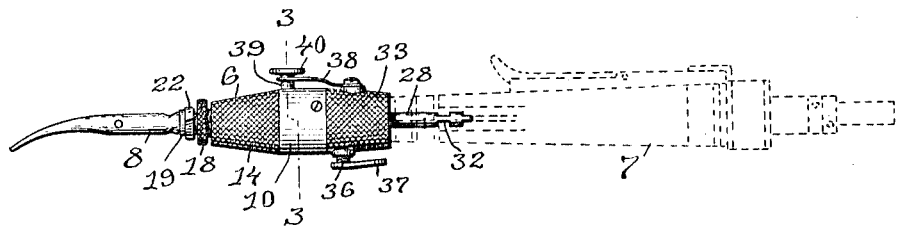
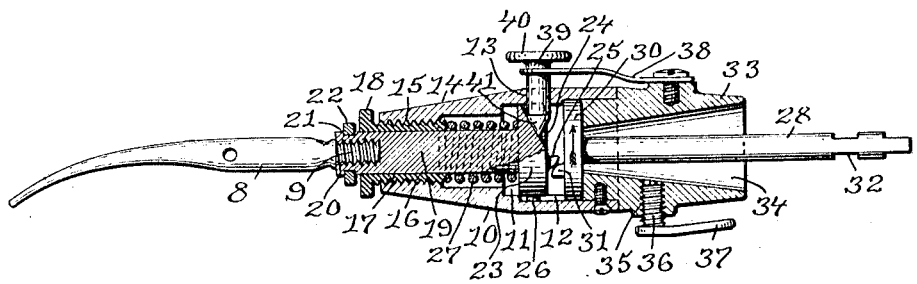
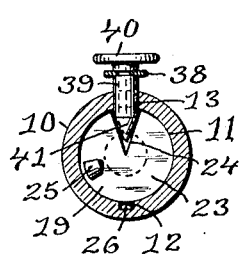
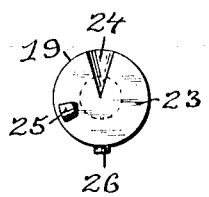
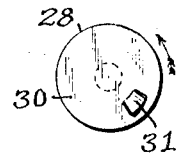
WITNESSES:
Julia Ricci
B. V. Gage
INVENTOR.
William Ambrose Salt.
by Chas. H. Luther.
ATTORNEY.

UNITED STATES PATENT OFFICE.

WILLIAM AMBROSE SALT, OF PROVIDENCE, RHODE ISLAND, ASSIGNOR OF ONE-HALF TO STEPHEN H. BRIGGS, OF PROVIDENCE, RHODE ISLAND.

DENTAL PLUGGER.

1,040,424.  Specification of Letters Patent.  Patented Oct. 8, 1912.

Application filed February 14, 1911. Serial No. 608,615.

*To all whom it may concern:*

Be it known that I, WILLIAM AMBROSE SALT, a citizen of the United States, residing at Providence, county of Providence, and State of Rhode Island, have invented a new and useful Improvement in Dental Pluggers, of which the following is a specification.

This invention has reference to an improvement in dental pluggers and more particularly to an improvement in dental pluggers adapted to be detachably secured to a dental hand-piece driven by the flexible shaft of a motor.

The above form of dental pluggers are usually complicated in construction, expensive to manufacture, are large and cumbersome, they extend out too far from the end of the hand-piece for convenience in operation and when provided with a device for adjusting the length of stroke, this device is in an inconvenient position to adjust and cannot usually be adjusted by the operator, when the plugger is in actual operation.

The object of my invention is to improve the construction and operation of a dental plugger, whereby the plugger is detachably attached to a dental hand-piece, is positively secured to the end of the hand-piece in any position required, is adjustable to give any length of stroke desired and the length of the stroke regulated while in operation, from the minimum to the maximum force or thrown entirely out of operation by a simple pressure of the thumb or finger.

Another object of my invention is to reduce the size and simplify the construction of a dental plugger embodying the above features, thereby reducing the cost of manufacturing the same.

My invention consists in the peculiar and novel construction of a dental plugger adapted to be detachably secured to a dental hand-piece and operated by the flexible shaft of a motor, said dental plugger having details of construction, as will be more fully set forth hereafter and claimed.

Figure 1. is a side view of my improved dental plugger in its operative position on a dental hand-piece, shown in dotted lines. Fig. 2. is an enlarged longitudinal sectional view of the plugger. Fig. 3. is an enlarged transverse sectional view through the plugger, taken on line 3. 3. of Fig. 1. Fig. 4. is an enlarged end view of the reciprocating member removed from the plugger, and Fig. 5. is an enlarged end view of the rotating member removed from the plugger.

In the drawings, 6. indicates my improved dental plugger, 7. a dental hand-piece shown in dotted lines in Fig. 1., and 8. a plugging tool. The hand-piece 7. has the usual tapered end, a shaft connected at its outer end to the flexible shaft of a motor and having on its inner end the usual grip for gripping any one of the dental tools used in the hand-piece and a lever for controlling the grip, all of which is well known. The plugging tool 8. has the usual screw-threaded end 9. as shown in Fig. 2.

The plugger 6. consists of a cylindrical body member 10. having a circular stepped chamber 11., a longitudinal groove 12. in the wall of the chamber, a radial hole 13. extending outward from the chamber 11. through the body member 10., and a tapered end 14. in which is a screw-threaded hole 15. which extends from the outer end into the chamber 11. A screw-threaded sleeve 16. in the screw-threaded hole 15. and having a central longitudinal hole 17. and a knurled flanged outer end 18. A reciprocatory stem 19. which extends through the hole 17. in the sleeve 16. and has in its outer end a screw-threaded hole 20., and an external annular groove 21., and on its inner end a circular head 23. constructed to have an inclined radial notch 24., a lug 25. on its face adjacent its periphery and a pin 26. which enters the groove 12. A split ring 22. in the annular groove 21. said ring limiting the inward movement of the reciprocatory stem 19. A coiled spring 27. surrounds the reciprocatory stem 19. and engages with the inner end of the sleeve 16. and head 23., the tension of the coiled spring holding the reciprocatory stem in its inward position under spring tension. A rotatable shaft 28. in the body member 10, and having on the inner end a circular head 30. which has lug 31. on its face in a position to engage the lug 25. and notches 32. in its outer end, by which the shaft is detachably secured in the hand-piece 7., by the grip in the hand-piece. A holding member 33. secured in the end of the body member 10. by screws and having a tapered hole 34. adapted to fit over the tapered end of the hand-piece 7., a radial screw-threaded hole 35. in which is a fastening screw 36, having a lever arm 37. A spring arm 38. secured at one end to the holding member 33, by a screw, and a controlling pin 39. secured to the free end of the spring arm 38. and having a head 40., on its outer end and a pointed inner end 41. which extends through the hole 13. and enters the inclined notch 24. in the head of the reciprocating member 19. as shown in Figs. 2. and 3.

When in use, the plugging tool 8. is firmly secured to the reciprocatory stem 19. by screwing the same into the screw-threaded hole 20. and the rotating shaft 28. inserted into the end of hand-piece 7. and gripped by the grip in the hand-piece in the usual way. The tapered end of the hand-piece (not shown) now fits into the tapered hole 34., the plugger is rotatably adjusted on the hand-piece to position the plugging tool 8. and the controlling pin 39. and the plugger firmly secured to the hand-piece 7. by the fastening screw 36. which engages the tapered end of the hand-piece. The rotation of the shaft 28. causes the lug 31. on the inner face of the head 30. to engage with the lug 25. on the outer face of the head 26. and force the member 19. and tool 8. outward, thereby giving the blow, against the tension of the coiled spring 27. which causes the head 26 and its stem 19. to rebound. The point of the tool 8. is thus caused to give rapid, regular and direct blows. The plugger may be set to give a predetermined length of stroke, by turning the sleeve 16. by the knurled flanged end 18. which being at the end of the plugger, is in a convenient position for the operator. The turning of the sleeve 16. to the right or left, moves the reciprocatory stem 19. lengthwise, to bring the lug 25. more or less into engagement with the lug 31. The length of the stroke is now accurately regulated, while the plugger is in operation, by pressure on the regulating pin 39., an inward movement of the pin forcing the reciprocatory stem 19. outward against the tension of the coiled spring 27. thereby decreasing the length of the stroke. When the pressure is released from the regulating pin, it returns to its normal position through the action of the spring arm 38. By this construction, the operator has the plugger under perfect control when it is in operation, the plugger may be set, while in operation, for any length of stroke required for the maximum force, and the force of the blows is accurately regulated from the minimum to the maximum force. By forcing the controlling pin 39. inward to its limit, the lug 25. is carried out of the path of the lug 31. thereby stopping the reciprocating movement of the reciprocatory stem 19, and plugging tool 8. for picking up pieces of gold, in filling teeth, or for other purposes, without stopping the motor or other source of power.

Having thus described my invention, I claim as new and desire to secure by Letters Patent:—

A dental plugger, comprising in combination, a two part chambered body member having a screw-threaded hole extending from the chamber through the forward end, a screw-threaded sleeve in the hole and having a knurled flanged outer end, a reciprocatory stem extending through the sleeve and having adjacent its outer end an annular groove, a ring in the annular groove, a circular head on the inner end of the reciprocatory stem and having an inclined radial V shaped notch in its face, and provided with a lug on its face, a coiled spring surrounding the reciprocatory stem and engaging the sleeve and the head on the stem, a rotatable shaft having a circular head on its inner end and a lug on the face of the head in a position to engage the lug on the head of the reciprocatory stem, a spring actuated controlling pin extending through the body and having an inverted cone shape inner end, adapted to enter and permanently engage the radial notch in the head of the reciprocatory stem, means for holding the reciprocatory stem against rotation, means for detachably securing the shaft to the grip in a dental hand piece, means for detachably securing the body to the dental hand piece and means for detachably securing a plugging tool to the outer end of the reciprocatory stem.

In testimony whereof, I have signed my name to this specification in the presence of two subscribing witnesses.

WILLIAM AMBROSE SALT.

Witnesses:
 JOHN H. M. NULTY,
 CHAS. H. LUTHER.